United States Patent [19]

Rentschler

[11] 4,227,792
[45] Oct. 14, 1980

[54] DEVICE FOR SETTING EXPOSURE TIME AND APERTURE SIZE ON CAMERAS

[75] Inventor: Waldemar Rentschler, Wildbad, Fed. Rep. of Germany

[73] Assignee: Prontor-Werk Alfred Gauthier GmbH, Wildbad, Fed. Rep. of Germany

[21] Appl. No.: 52,281

[22] Filed: Jun. 26, 1979

[51] Int. Cl.$^3$ .............................................. G03B 9/24
[52] U.S. Cl. .................................. 354/230; 354/234; 354/271
[58] Field of Search ............................... 354/228–236, 354/270–273

[56] References Cited

U.S. PATENT DOCUMENTS

| | | | |
|---|---|---|---|
| 3,584,561 | 6/1971 | Starp | 354/230 |
| 3,864,700 | 2/1975 | Mielke | 354/271 X |
| 3,984,847 | 10/1976 | Kato | 354/231 X |
| 4,079,400 | 3/1978 | Kondo | 354/234 |

*Primary Examiner*—John Gonzales

[57] ABSTRACT

A device for setting or controlling shutter exposure time and diaphragm working aperture size on cameras having a lens shutter assembly with a reciprocating shutter sector system for opening and closing the lens passage and a diaphragm segment system which is also suitable for closing the shutter opening of the lens passage, the sector system and the segment system both preferably being independently driven by corresponding electrodynamic drive units selectively controlled by an electronic control circuit incorporating a microcomputer, such that first the diaphragm segments are driven at comparatively low driving energy or speed to define a manually or automatically predetermined size working aperture, then the shutter sectors are moved to open the lens passage for exposing the film, and thereafter the diaphragm segments are again driven but at comparatively high energy or speed, commencing at a selectively timed interval after the movement of the shutter sectors to open position, whereby to close the lens passage.

17 Claims, 7 Drawing Figures

DEVICE FOR SETTING EXPOSURE TIME AND APERTURE SIZE ON CAMERAS

The present invention concerns a device for obtaining extremely short exposure times and for the formation of diaphragm apertures adequate for photography, using a lens shutter assembly having a lens passage fitted with a reciprocating shutter sector system for forming a shutter opening and a reciprocating diaphragm segment system initially for forming the working aperture at a slow movement rate and subsequently for closing the shutter opening and the lens passage at a high movement rate.

Lens shutter arrangements are known which have a shutter blade system for initially fully exposing the lens passage and a diaphragm segment system adjustable, either by manual preselection or in dependence upon ambient lighting conditions, to achieve a certain working aperture size, with the diaphragm system moving to the closed position to complete the film exposure after a time interval determined by a time forming device. However, these systems have proved to be in need of improvement, in that the setting of the diaphragm segment system to the working aperture is effected with the same high driving force and high initial speed as is required for its critical losing operation. Since the diaphragm segment system and the mechanism serving for its drive, i.e. the entire masses taking part in achieving the movement of the segment system, have to be suddenly stopped upon reaching the position corresponding to the working aperture size selected, the segments swing beyond the intended value or oscillate for a certain time about this value due to inertia and the inevitable play which occurs in the movement system.

This may lead to undesirable exposure errors since, at the beginning of the closing shutter movement of such diaphragm segments, they have not yet come to rest as a consequence of their aperture size formation movement, and thus form an aperture deviating from the intended value. Otherwise, the beginning of the closing shutter movement of such diaphragm segments must be effected only after the oscillations of the segments have died away, a factor which results in undesirably great time parallaxes or deviation intervals between the actuation of the camera release button and the beginning of the exposure. In addition, the accurate stopping of the diaphragm segment system, i.e. at the end of its opening aperture formation phase for reverse movement during its closing shutter phase, signifies a conversion of the kinetic energy present at the stopping time point into deformation work which adversely affects the life and precision of the entire diaphragm segment mechanism.

It is among the objects and advantages of the present invention to overcome the above noted drawbacks and deficiencies of the prior art and to provide a simple controllable diaphragm operating system suitable for use in modern cameras, more particularly single lens reflux cameras, which, on the one hand, is capable of satisfying the conditions for achieving extremely short exposure times, e.g. 1/500 sec., and which, on the other hand, is characterized both by exact reproducibility of the controlled diaphragm aperture sizes or values and by a high degree of operating accuracy and reliability, as well as by a long useful life.

Other and further objects and advantages of the present invention will become apparent from a study of the within specification and accompanying drawings, in which.

According to the present invention, a device is provided for achieving extremely short exposure times and for the formation of diaphragm apertures adequate for photography, using a lens shutter assembly having a lens passage fitted with a reciprocating shutter sector system for forming a shutter opening and a reciprocating diaphragm segment system for forming the working aperture of the lens passage and also for closing the shutter opening and the lens passage. Under the influence of control means, the diaphragm segments are movable from a basic position, in an initial movement, at low driving energy or low operating speed, for the setting of the segments to a manual or lighting-dependent predetermined working aperture size or value. Following the beginning of the opening movement thereafter of the shutter section system for forming the shutter opening, and at the end of a timed interval corresponding to the adjusted or controlled exposure time, the diaphragm segments, which have meanwhile come to rest, are again moved, in a subsequent movement, at high driving power or high operating speed, for closing the shutter opening and the lens passage.

Since, in the usual case, for automatic setting or formation, following the actuation of the camera release button and prior to the actual exposure of the film in the camera, a time interval in the order of magnitude of 20 to 25 milliseconds (ms) may be required, as known for example from modern single lens reflex cameras, it is possible, by means of the low driving energy and low operating speed advantageously contemplated herein, to move the diaphragm segments carefully and gently, in a timely manner, to the initial setting position corresponding to the diaphragm working aperture size or value selected. As a result, when this initial diaphragm formation setting is reached, the segments have only low kinetic energy and can therefore be easily arrested from any further movement.

This leads to the specific advantage that the entire diaphragm operating system remains free of any adverse stresses having an unfavorable effect on its functioning capacity. In addition, very exact aperture setting and exact reproducibility of the aperture setting sizes or values are insured thereby, since due to the low kinetic energy involved, the adverse conditions for swinging the diaphragm segments beyond the actual intended value and for the occurrence of oscillations about this value are completely absent.

In accordance with a preferred aspect of the present invention, conventional, controllable electrodynamic driving systems are provided, for automatically driving or reciprocating the shutter sectors and also for automatically driving or reciprocating, i.e. after a selectively timed delay interval, the diaphragm segment system, independently of one another and at a selectively different driving energy and operating speed or movement rate. The special advantage of this type of independent adjustable movement rate drive resides in the fact that it is free from the disadvantages associated with a strictly mechanical spring motor drive or the like with respect to length of useful life and mechanical power transmission arrangement possibilities, while permitting very flexible control of the overall operations to be effected.

With regard to the control means for effecting the movement of the sector system and segment system, such may include an adjustable electronic control circuit in the camera which controls the operation of the corresponding electromagnetic drives. In this regard, with such a control circuit, particularly favorable conditions may be achieved in connection with the adjustability and reproducibility of the diaphragm working apertures, which are formed, e.g. automatically in dependence upon ambient light. Specifically, the formation of the working aperture may be readily achieved in known manner in association with an electromagnetic-mechanical locking device disposed in the circuit of an electronic threshold value circuit in the control circuit and acting on the electrodynamically driven actuating part of the diaphragm segment system.

Additionally, the exposure control system can be further freed from adverse mechanical stresses, in accordance with the present invention, in a favorable manner by arranging the electronic control circuit so that the energizing of the electrodynamic drive used for moving the diaphragm segment system is interrupted almost simultaneously with the generation of a switching pulse actuating the electromagnetic-mechanical locking device.

The electromagnetic-mechanical locking device may be suitably provided either as a finely graduated ratchet lock or as a friction lock, with one lock part connected directly to the segment actuating part or an intervening segment control part of the diaphragm segment system, whereby the advantages of attaining high accuracy of the aperture values formed upon adjustment during the initial movement of the diaphragm segments and maximum speed of shutter closing movement during the subsequent movement of the diaphragm segment will result. These advantages occur because intermediate members and masses, which would otherwise reduce the acceleration characteristics of the system, are absent. In addition, for switching off the electromagnetic-mechanical locking device, the ratchet lock may be conveniently provided with a fine degree of ratchet graduations in an economical manner by employing plastic ratchet teeth, e.g. produced by injection molding of synthetic material.

Figure 1:
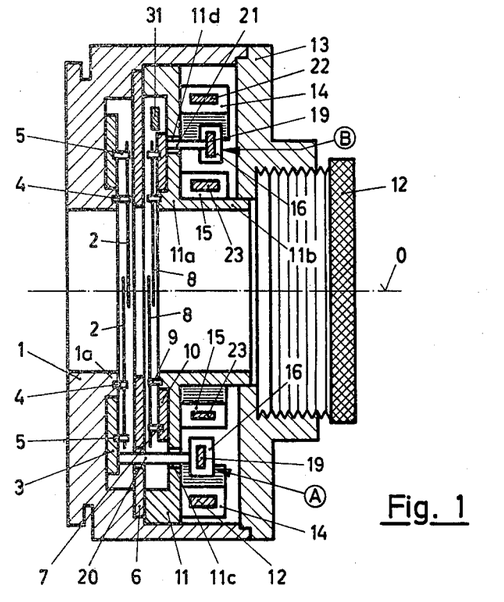
FIG. 1 is a schematic illustration partially in section of a lens shutter assembly according to an embodiment of the present invention, positionable on a camera and having a shutter sector system and a diaphragm segment provided with corresponding electrodynamic drives for driving such systems.
Figure 2:
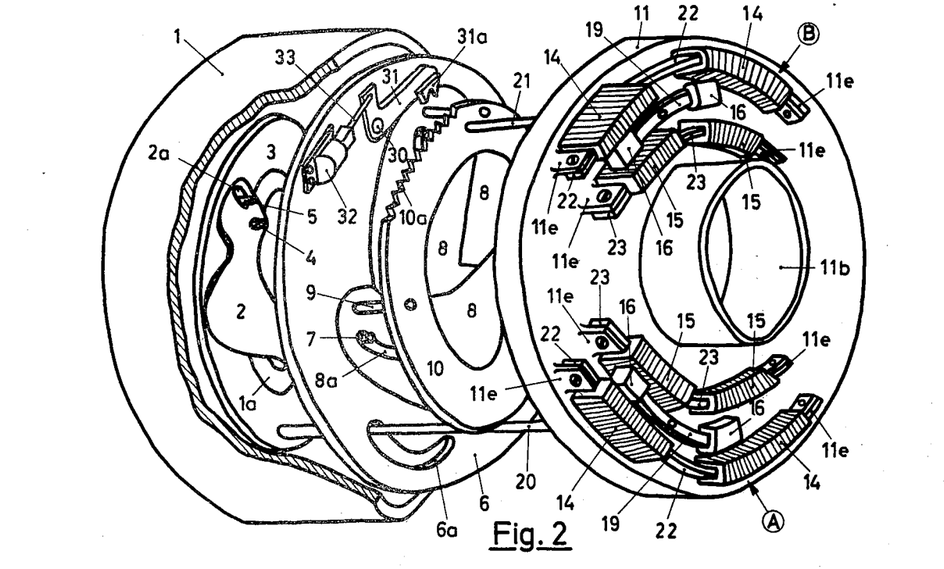
FIG. 2 is a schematic perspective exploded view of the lens shutter assembly of FIG. 1.

Referring to the drawings, and initially to FIGS. 1 and 2, a lens shutter assembly or housing 1 is shown which is interchangeably attachable to a camera C in known manner by means of a bayonet connection or the like (not shown).

The housing 1 of the shutter assembly has a cylindrical portion 1a which is provided concentrically to the lens axis 0 and on which a shutter actuating ring 3 for driving the shutter sectors or blades 2 is journalled to rotate. The shutter sectors 2 of the five-bladed shutter system for example are journalled to rotate in this instance on fixed pins 4 mounted on stationary cylindrical portion 1a and brought into driving connection with ring 3 by means of a sector slot and ring pin connection 2a, 5 in the usual way.

A stationary cover disc 6 located in the shutter housing 1, axially outwardly of the shutter system, is provided with a plurality of fixed setting pins 7. The pins 7 engage in slots 8a formed on the diaphragm segments or blades 8 of a three-bladed diaphragm system, for example. The geometrical form and course of the slots 8a is selected so that the diaphragm segments, in driving connection with a diaphragm actuating ring 10 by means of respective ring pins 9, are moved out of their basic position into an opening or closing position or setting as soon as the ring 10 executes a rotation in one direction or the other in the well known manner.

The actuating ring 10 is mounted on a stationary cylindrical portion 11a of a base plate 11 inserted into the shutter housing 1 axially outwardly of the cover disc 6 and provided with a tubular socket 11b. The tubular socket 11b forms, together with the cylindrical casing of the shutter housing 1, an annular space which serves for the fitting of the independently energizable electrodynamic or electromagnetic drive units A and B for driving the actuating rings 3 and 10 back and forth to move the shutter sectors 2 and diaphragm segments 8 in the desired manner. Such annular space is closed by means of a front plate 13.

The usual adjustment holder for the front member of the lens system (not shown) is indicated by 12. In the case of a lens system which is adjusted as a whole for distance setting, the shutter housing is arranged in a conventional helical screw unit in the typical manner.

The stationary base plate 11 on which the opposed separate sets of electromagnetic field coils 14 and 15 on each of the drive units A and B (see FIG. 2), to be described in greater detail hereinafter, are secured, is made of a magnetically non-conductive material, for example brass or aluminium alloy, as the artisan will appreciate. The movable part or yoke strap 19 of the drive unit A is connected to the shutter blade actuating ring 3 for driving the shutter sectors 2 by means of a driving pin 20, and for this purpose extends through arcuate clearance slots 11c and 6a provided in the stationary base plate 11 and in the stationary cover disc 6 respectively. The movable part 19 of the drive unit B and the driving unit 10 for driving the diaphragm segments 8 are brought into connection with each other by means of a similar driving pin 21, and for this purpose, the pin 21 extends through an arcuate clearance slot 11d adapted to the circular movement path of the pin and cut into the base plate 11, i.e. in corresponding manner to the pin and coaxially aligned slot arrangement of pin 20 and slots 11c and 6a.

Both driving pins 20 and 21 thus simultaneously serve as supports for the movable parts 19, on the ends of which permanent magnets 16 cooperating with the electromagnetic coils 14 and 15 are correspondingly arranged, for individually and independently transmitting the rotating or reciprocal motion of the permanent magnets 16 under the influence of the cooperating coils 14 and 15 to the shutter actuating ring 3 and diaphragm actuating ring 10, as the case may be.

Figure 3:
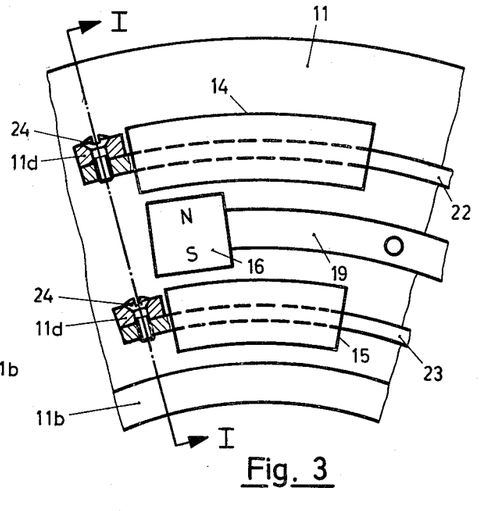
FIG. 3 is a schematic enlarged partial view of the base plate of the lens shutter assembly of FIG. 1 showing the disposition of the magnetic field coils and interposed permanent magnet of one of the electrodynamic drives.
Figure 4:
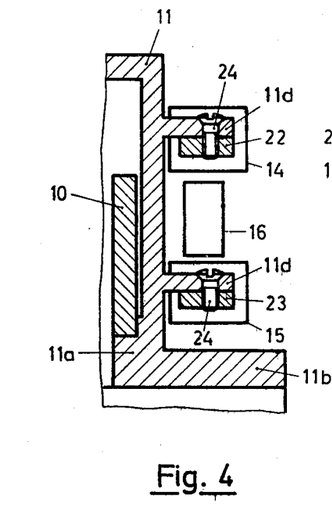
FIG. 4 is a schematic sectional view of the base plate taken along the line I—I of FIG. 3.

As far as the coils 14 and 15, associated with both drive units A and B, are concerned, these are formed of conductive wire windings located on magnetically conducting closure segments or cores 22 and 23. The radially opposed sets of coils 14 and 15, associated with each other in circumferentially spaced apart pairs, and the closure segments 22 and 23 supporting these coils are, as may be seen more particularly from FIGS. 3 and 4, secured at their ends to magnetically non-conductive ears or flaps 11e or the like which may be formed on or fixedly secured to the stationary base plate 11. As securing means for the closure segments 22 and 23, similarly magnetically non-conducting parts, such as brass screws 24 or the like, may be used.

When current flows through the corresponding coils 14, 15, in a particular direction, i.e. under the influence of the control circuit 45a (FIG. 5) located in the camera and suitably energized by a power pack (not shown) such as the one or more dry cells, the north and south polarized permanent magnets 16, fixedly carried on the movable parts 19 respectively, are first moved in one direction and, after re-polarizing or reversing the current flow direction, are correspondingly moved in the opposite direction. If required, a plurality of concordant drive units A and B may be respectively provided, as the artisan will appreciate.

In the example shown, two independent systems are provided, one acting on the shutter sector actuating ring 3 and the other acting on the diaphragm segment actuating ring 10. This, however, is only for reasons of greater clarity. More specifically, in place of the arrangement of one driving system for each of the shutter and diaphragm mechanisms as shown in FIGS. 1 and 2, it will be realized that preferably two such drive systems or units concordantly may be provided, if desired, for acting simultaneously on the shutter actuating ring 3, and that in the same way two such drive systems or units concordantly may be provided for acting simultaneously on the diaphragm actuating ring 10.

Moreover, if desired, only one permanent magnet 15 or 16 and associated opposed set of coils 14, 15 may be utilized for each driving system or unit A or B, rather than two as shown, as the artisan will appreciate, although with less efficient results than the more balanced system arrangements as shown.

As may be seen from FIG. 2, an electromagnetic-mechanical locking or stopping system or device is associated with the actuating ring 10 for the diaphragm segments. This device substantially comprises a locking or arresting lever 31 pivotally mounted to tilt on a fixed pivot pin 30, and a solenoid 32 for the actuation of the lever 31. Lever 31 is connected with the solenoid 32 by a coupling rod 33 for operation in the normal manner. Both the solenoid 32 and the pin 30 supporting the locking lever 31 may be conveniently fixedly secured to the stationary cover disc 6.

The locking lever 31, provided on its outer or free end with a locking tooth or pawl 31a, cooperates with locking teeth 10a which are provided on the circumference or rim of the diaphragm setting ring 10 which is used for actuating the diaphragm segments 8. The arrangement is such that, when the locking tooth or pawl 31a is brought into engagement with the locking teeth 10a on the ring 10, further movement of the ring 10 from its basic position and consequently of the diaphragm segments 8 is stopped or arrested. The segments 8 are thus held in the stopped or arrested position until the ring 10 is released by deactivation or reverse movement of the magnet lock system 30 to 33.

Figure 5:
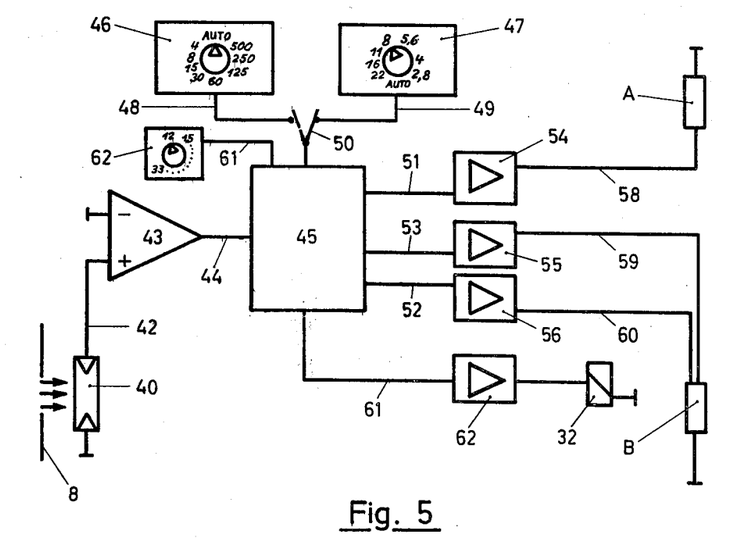
FIG. 5 is a schematic block circuit diagram of an electronic control circuit on the camera which is suitable both for manual and light-dependent determination of diaphragm and/or shutter exposure time values for controlling the shutter sector and diaphragm segment mechanism of the lens shutter assembly embodiment of FIG. 1, according to the present invention.

The size aperture (working diaphragm) achieved by the diaphragm segments 8 is determined by a switch pulse which issues from the control circuit shown in FIG. 5 in accordance with a preselected manual or sensed ambient lighting condition automatic adjustment. This causes, after a time interval of variable length, calculated from the beginning of the movement of the diaphragm setting ring 10, a magnetic field to be built up in the solenoid 32 which brings the locking lever 31 into engagement with the teeth 10a. For forming or setting the diaphragm aperture size or value, the program structure of the microcomputer 45 of the circuit 45a according to FIG. 5 is selected and adjusted appropriately, as the artisan will appreciate, such that simultaneously with, or directly before, the actuation of the electromagnet or solenoid 32, the drive of the diaphragm setting ring 10 effected by means of the electrodynamic drive unit A is desirably interrupted. This synchronized or conjoint action effectively minimizes or avoids completely any adverse stresses which could endanger the functioning capacity of the magnet lock system 30 to 33 and even of the diaphragm system.

A friction lock, which may have a construction identical to a considerable extent with the above-described magnetic lock, may be used as a suitable alternative lock or stopping system for the blocking or arresting of further movement of the diaphragm actuating ring 10, as the artisan will appreciate. Instead of the locking tooth 31a, however, this friction locking arrangement may be provided with a stopping member on the locking lever 31 which acts on the setting ring 10 by simple friction braking technique. Such stopping member may be made of rubber or any other material having a high coefficient of friction, and may merely constitute a sleeve composed of high friction material such as rubber sized to slide onto the free end of lever 31 and held in place by a known adhesive material, retaining screw or embracing holding strap, or the like. In such instance, the tooth 31a and the teeth 10a will preferably be omitted.

When, however, a ratchet lock of the type shown in FIG. 2 is used, instead of a friction lock, a particularly fine graduation of the sizing or value of the diaphragm aperture may be achieved in a simple manner. This is especially so if two toothed segments are provided on ring 10 for the locking teeth 10a and are associated with each other in side by side but circumferentially offset manner so that the teeth thereof are relatively displaced, e.g. by one half-tooth. The two sets of of tooth segments may be associated with each other in a fixed arrangement or may be mounted relatively displaceable to each other on the circumference or rim of ring 10, as desired.

Using a control circuit according to that shown in FIG. 5 or a circuit of similar design, extremely short exposure times can be advantageously achieved according to the invention with a lens shutter assembly having electrodynamic drive units A and B for the shutter sectors 2 and the diaphragm segments 8, if, after the previous setting of the diaphragm system to a certain aperture size or value (working diaphragm) adequate for the ambient lighting, only the opening function of the light passage is allocated to the shutter sector system 2 to 5 while the closing function is allocated to the diaphragm system 8 to 10. Hence, separate opening and closing blade systems are provided for independently opening and independently closing the shutter aperture or lens passage.

Although arrangements of this type are already known, as earlier discussed, these have not provided for actuation of the diaphragm system 8 to 10 at differential movement rates in a manner as contemplated herein, which insures extremely accurate and absolutely reliably reproducible setting of the diaphragm segments 8 to a manually initially fed-in or lighting-dependent controlled diaphragm size or value, with simultaneous precise operation of the diaphragm mechanism both initially for diaphragm aperture formation and subsequently for closing shutter operation.

The diaphragm control operation or method according to the present invention, achieved by the above-described shutter assembly arrangement, is described hereinafter.

The main part of this operation is the significant feature that the diaphragm system 8 to 10, taking part in the shutter closing function as well as in the diaphragm working aperture formation function, is driven in two different power and speed stages, or at two different movement rates. Specifically, the diaphragm segments 8 are first adjusted from a basic or starting setting initially at a low speed (low driving power) to a specific selective aperture value (working diaphragm). On the basis of this comparatively slow or low rate setting movement of the diaphragm system 8 to 10 with a relatively low initial speed or driving power, the advantage is obtained, among other things, of attaining a readily reproducible diaphragm setting.

The setting or diaphragm formation function of the diaphragm system 8 to 10 for achieving a specific selective working aperture can be effected in an initial movement phase advantageously over a relatively large time interval, for example, of the order of magnitude of 20 to 25 ms., prior to the opening movement of the shutter system for exposing the film material. From the adjusted aperture position reached in the initial movement phase, the segments 8 after meanwhile again coming to rest are moved in a second movement phase, on the other hand, at the greatest possible speed into a closed position, thereby closing the shutter opening and the lens passage.

For this purpose, only an interval of about 2 ms are generally available if, for example, a very short exposure time of 1/500 sec. is to be obtained with the usual camera arrangement. This time limit or interval must not be exceeded even when the segments 8 must travel from maximum open position to fully closed position in order to cover the entire light passage, i.e. when the segments 8 have to move into the covering position in the closing shutter operation from the maximum possible opening width of the working aperture. The reciprocating shutter sectors 2, which uncover the exposure opening only after the setting of the working aperture in the initial movement of the diaphragm segments 8, on the other hand, may return again to the closed position after a non-critical time delay only because the segments 8 have previously properly terminated the exposure, i.e., have assumed the covering position, rendering such time delay inconsequential.

In principle, it is immaterial whether the segments 8 completely close or completely open the lens passage in the basic or starting position, that is to say, assume a covering or opening position before a photograph is to be taken, since the diaphragm will understandably always be preadjusted in the initial movement phase to the proper working aperture before the sectors 2 of the shutter system are moved to open position to start the film exposure.

With the use of the diaphragm control system of the present invention on a single lens reflex type camera, the "open" basic or starting position is contemplated, in order to permit reflex mirror viewing of the image and sensed ambient light measurement through the lens system, and for this purpose the diaphragm aperture and shutter must be wide open. However, during this time the downwardly tilted reflex mirror safely covers the film window and protects the film material threat from premature exposure. On the other hand, in the case of view-finder type cameras, it may be of advantage with respect to the additionally achievable convering effect of the diaphragm system, if the segments 8 are completely closed in the basic or starting position along with the sectors 2 of the shutter system.

Thus, in one case, the segments 8 move in the direction from the completely open or maximum width position toward the closed position when being adjusted in the initial movement phase to form the diaphragm working aperture and, in the other case, in the direction from the closed position toward the completely open position.

In the electronic control circuit according to FIG. 5, a light-sensitive or light-responsive element, preferably a photo-diode 40, which is generally known for and usually already provided in single lens reflex cameras, is arranged for the measurement of the ambient light at the lens opening and changes of the light intensity thereof as effected by the size of the aperture provided by the segments 8 of the above-described diaphragm system 8–10. By means of a current conductive lead 42, the photo-diode 40 is connected to the non-inverting input of an operational amplifier 43 which, acting as a current amplifier, is connected by means of an output lead 44 to a microcomputer 45 storing and calculating all the instructions for the exposure function of the camera in the well known manner.

Conventional, manually actuated adjusting devices on the camera, including potentiometers or the like, indicated by 46 and 47 in the block circuit diagram according to FIG. 5, serve for the selective pre-setting of one or the other of the two exposure parameters, i.e. working "aperture" or shutter "exposure time", for the taking of a photograph. The device 46 is provided for preselecting the exposure time and the device 47 is provided for preselecting the diaphragm aperture. Both setting devices 46 and 47 may be selectively connected by means of leads 48 and 49 to the microcomputer 45, via a manually actuatable change-over switch 50 in the usual way.

The computer 45 has a plurality of outputs connected by current conductive leads 51 to 53 to differential rate output switches 54 to 56 respectively. These switches 54 to 56, which are able to switch from low current to high current spontaneously and briefly are particularly provided to supply the field coils 14 and 15 of the electrodynamic drive units A and B with current at a selective strength which is adequate for the operation of the particular drive unit during a given phase of its operation as controlled by the selective adjustment of the microcomputer in the control circuit.

For this purpose, the shutter drive unit A for driving the shutter sectors 2 is connected through the lead 58 to the output switch 54 from which the shutter drive field coils 14 and 15 of this assembly are energized. This is effected in such manner that the shutter drive coils 14 and 15 for achieving an opening movement of the shutter sectors 2 are first energized in one direction and for achieving a closing movement are then energized in the opposite direction, i.e. by a suitable switch-over arrangement after a predetermined time delay interval.

The diaphragm drive unit B serving to drive the diaphragm segments 8, on the other hand, is connected through one individual lead 59 to the output switch 55 and through another individual lead 60 to the output switch 56. While the switch 55 gives only a comparatively low output, the switch 56 is designed so that a much higher output can be fed from it to the diaphragm drive field coils 14 and 15. In any event, the output of each such switch individually is always only in the same flow direction through the corresponding lead 59 or 60 as the case may be and without any switch-over as in the energizing arrangement of the shutter drive unit A through the common lead 58.

In addition, the design of the circuit is such that, understandably during the function of the control circuit, controlled by the microcomputer 45, low current is fed firstly to the diaphragm drive field coils 14 and 15 of the diaphragm drive unit B through the low output switch 55. When this occurs, the diaphragm segments 8 are moved under the influence of the control circuit at a relatively low or slow movement rate out of the given basic or starting position with low power or operating speed to the formation position corresponding to the working aperture value as manually preselected or as automatically selected or controlled in dependence upon the ambient lighting conditons as sensed by the light responsive means 40.

This initial movement of the diaphragm segments 8 is completed as soon as the magnetic lock system 30 to 33, connected by means of the current conducting lead 61 and the output switch 62 to the microcomputer 45, comes into action and stops further initial movement of the diaphragm setting ring 10.

Synchronously with the arresting engagement of the magnetic lock system 30 to 33 against the diaphragm ring 10, the flow of current to the diaphragm field coils 14 and 15 is interrupted, as also controlled by the microcomputer 45.

During another function, after the appropriate time interval, which is preselected manually or formed automatically in dependence upon the sensed lighting conditions in the control circuit and within which the shutter sector system 2 to 5 has uncovered the light passage by the operation of the shutter drive unit A as above described, yet which occurs after the initial movement of the diaphragm segments 8 by the earlier operation of the diaphragm drive unit B, the diaphragm drive field coils 14 and 15 of the drive unit B are again energized. However, this time the diaphragm drive field coils are not energized via the output switch 55, but rather in the opposite direction via the output switch 56. As a result, after previously or synchronously unlocking the diaphragm setting ring 10 by intervening release of the magnetic lock system 30 to 33, by the control circuit, this ring 10 and consequently the diaphragm segments 8 are transferred with extremely high speed, under the cooperatively high output switch 56, from the previously assumed diaphragm working aperture formation position to the completely closed position.

As known in principle from conventional camera design, the arrangement of the above-described electronic control circuit is already provided on the camera. The connection thereof with the electrodynamic drive units A and B on the removable lens shutter is readily effected in this case by means of suitable conventional pin or spring contacts (not shown) on the corresponding parts which come into action automatically in the usual way with the mounting of the interchangeable shutter or lens assembly on the camera, as the artisan will appreciate.

The sensitivity of the film material in the camera can be taken into consideration by a conventional device 64, indicated only schematically in FIG. 5, and connected to the microcomputer 45 by a current conductive lead 63. By means of this device 64, the DIN and ASA value, or the like, of the film material can be fed electrically, for example, as a resistance value into the computer 45 in the usual way for the required purposes.

Figure 6:
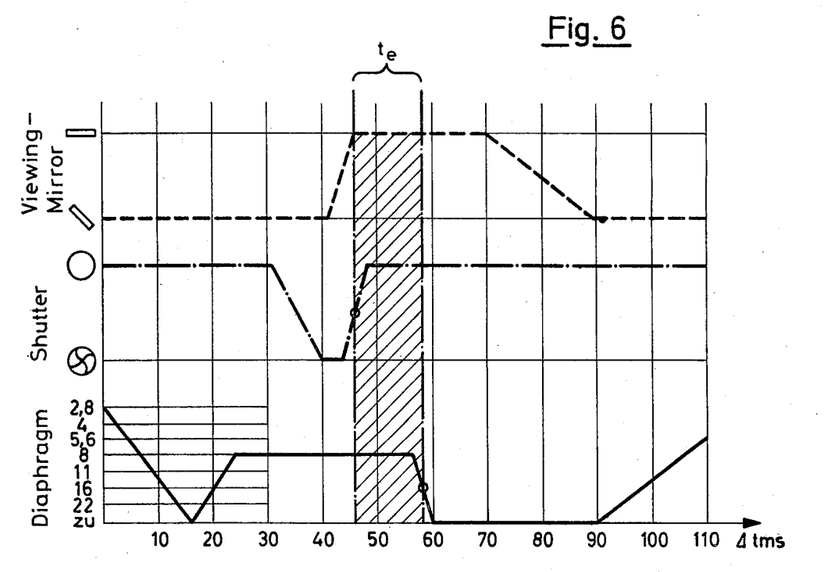
FIG. 6 is a schematic function diagram of a lens shutter assembly fitted with an exposure control system according to the present invention, for a single lens reflex type camera, wherein the function of the diaphragm segments is indicated by a continuous line, that of the shutter sectors by a dot-dash line and that of the viewing mirror by a dash line.

The mode of operation or function of the above-described electrodynamic shutter assembly having a diaphragm system controlled to perform in accordance with the present invention, for instance on a single lens reflex camera, is as follows:

For the purpose of observing an image via the reflex viewing mirror through the lens assembly, both the shutter sectors 2 and the diaphragm segments 8 are initially placed in the basic fully open position and the mirror is placed in tilted viewing position, upon setting the camera for taking a photograph, as may be seen from the function diagram according to FIG. 6. After actuation of the camera release button (not shown), which actuates a circuit triggering switch in the control circuit in the usual manner, the diaphragm system 8 to 10 is at first moved temporarily from fully open to fully closed position for the purpose of automatically determining the light intensity passing via the still open shutter systme 2 to 5 through the view-finder and reaching the photoelectric sensor 40 located in the camera, or taking into account and eliminating this light intensity value during the subsequent formation of the working aperture in the usual way.

From this basic "reference" position, the segments 8 are then moved, in an initial movement, at low speed in an opening direction from the fully closed position until a certain selected aperture size is reached, which corresponds to a manually preadjusted or light dependent automatically controlled value. The magnetic lock system 30 to 33, then automatically comes into action, engaging the locking teeth 10a of the diaphragm ring 10 which drives the diaphragm segments 8 to prevent the ring 10 from undertaking any further movement.

When using an automatic exposure setting, i.e. "automatic aperture formation with exposure time preselection", for example, the magnetic lock system 30 to 33 is controlled in dependence upon the film sensitivity, the preselected exposure time and the quantity of illumination of the photoelectric receiver 40 provided behind the lens system in holder 12, evaluation being effected by the microcomputer 45. If, on the basis of this evaluation, the diaphragm aperture, as shown in FIG. 6, is set for example to the aperture value "8", the shutter sectors 2 are then transferred from the basic fully open position to the temporary fully closed position.

Next, upon the return of the mirror from the viewing position, which up to this point blocked the film material from exposure, to the horizontal position out of the light path from the lens opening to the film material, the shutter sectors 2, after only a few milliseconds, under the influence of the control circuit, uncover the light passage, returning to their basic fully open position, whereby the exposure of the light sensitive film material begins by way of the lens opening and the working aperture. After the expiration of the exact preselected exposure time interval or such time interval as may have been corrected by the microcomputer 45 in dependence upon the aperture size actually achieved, the now static diaphragm segments 8 are moved, in a subsequent movement, with maximum speed in the direction of the closed position, under the influence of the control circuit, after the intervening automatic release of the magnetic lock system 30 to 33, the completely closed position of the diaphragm segments 8 being reached in about 2 ms. The exposure process is then concluded.

After a time interval of about 10 ms, the mirror automatically returns to the film material blocking tilted viewing position and, after a further 20 ms, the segments 8, once again driven with low power, return to the basic fully open position, as shown in the diagram according to FIG. 6, under the influence of the control circuit, so that the camera is ready to take the next photograph.

It will be appreciated that the movement of the mirror between the tilted viewing and horizontal positions takes place in the usual manner.

As far as the manual setting of the camera diaphragm system with automatic light-dependent setting of the shutter exposure speed is concerned, this is obtained in the usual way by means of the selector device 47 provided on the camera which has the typical position "auto" in addition to an aperture setting scale. The resistance value fed to the control circuit by manual setting, e.g. by means of a potentiometer, leads to the same effect as a corresponding resistance value received automatically from the photoelectric receiver, whereas the shutter speed usable therewith is adjusted automatically in the control circuit in dependence upon the value of such photoelectric receiver.

In another manner, the aperture setting may be obtained by means of a selector device provided on the lens assembly and adjustable to "auto" and "manual" diaphragm settings in the conventional manner. For instance, such device may include a control cam rendering possible the alignment of a setting scale and may be provided with a stopping lever movable into the path of the lens assembly diaphragm setting ring. This lever, depending on the position of the control cam of the diaphragm selector device, may thereby limit the movement of the electrodynamically driven diaphragm ring 10.

The above-described diaphragm control system also permits in a simple manner any desired opening and closing of the diaphragm system for monitoring the depth of focusing. For this purpose it is only necessary that, after the working diaphragm setting is reached, the magnetic lock system 30 to 33 be arranged to be released again and the diaphragm segments 8 then moved electrodynamically back into the open position.

As already indicated above, the diaphragm system controlled to perform in accordance with the present invention may also be used on view-finder cameras, i.e. which do not include a reflex mirror. According to the function diagram shown in FIG. 7, under the influence of the control circuit, the diaphragm segments 8 are first set, for initial movement, at low speed from the basic closed position to the selected working aperture value position on a camera of this type. This occurs upon the release of the camera shutter release button (not shown) and with the shutter sectors 2 still in the closed position, for which purpose a time interval of 20 ms is available.

Of course, as before, the actuation of the shutter release button actuates a circuit triggering switch in the control circuit in the usual manner, whereby to achieve either automatic diaphragm setting with shutter exposure speed preselection, or vice versa, as the case may be, just as in the case of the operation according to FIG. 6.

Figure 7:
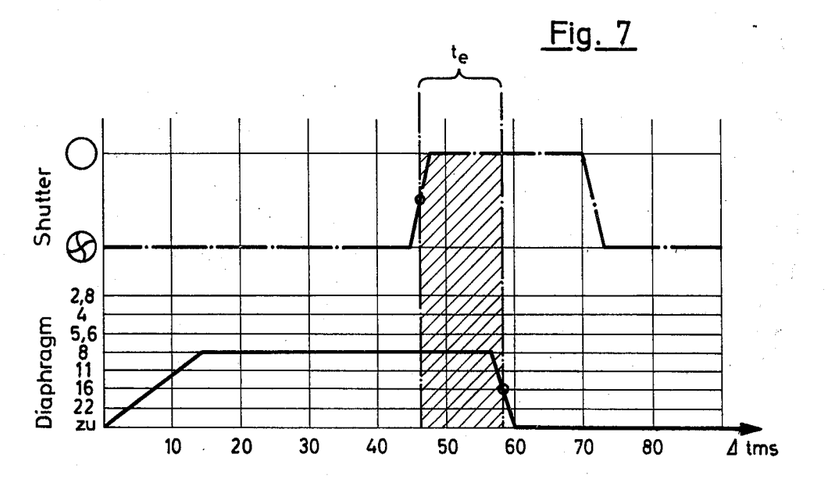
FIG. 7 is a schematic function diagram of a lens shutter assembly according to the invention, for viewfinder type cameras, wherein the function of the diaphragm segments is indicated by a continuous line and that of the shutter sectors by a dot-dash line.

After the aperture setting operation which, according to FIG. 7, is concluded upon the reaching of the aperture value "8" or with the coming into action of the magnetic lock system 30 to 33, the uncovering of the light passage is effected by the sudden opening movement of the shutter sectors 2 from the basic closed position thereof. Thus, the exposure of the light-sensitive film is initiated through the previously adjusted working aperture. This is automatically terminated after a further period of time, either as preadjusted or formed by the control circuit in dependence upon the sensed ambient lighting, in that the diaphragm segments 8 are released by the magnetic lock system 30 to 33, whereupon these segments return to the basic covering position, in a subsequent movement, at high speed. Thus, the exposure process is effectively concluded.

However, the shutter sectors 2 in this arrangement which are still in the open position are non-critically returned to the basic closed position after a further interval of about 10 ms, so that the camera is ready to take the next photograph.

Cameras fitted with the above-described diaphragm control means according to the present invention are characterized particularly by the feature that very short exposure times, such as for example 1/500 sec, can be achieved with maximum reliability and consequent guarantee of long useful life of the diaphragm mechanism. These advantages are obtained with the use of any diaphragm aperture size, and particularly for a very small aperture so that the effective exposure times $t_e$ as shown in FIGS. 6 and 7 can in fact be evaluated as "exposure correct". This means that, for example, a "genuine" 1/500 sec or even a shorter exact actual exposure time can be associated with the reduced size diaphragm aperture value "22", as calibrated, even though in general the effective exposure time $t_e$ is longer when using lens shutters for taking photographs at a reduced size diaphragm aperture than with reference to the full or open size diaphragm aperture.

The program structure of the microcomputer 45 of the control circuit according to FIG. 5, in accordance with a further feature of the present invention, is designed for adjustable operation so that whenever the exposure process takes place with a longer limiting exposure time than a specified exposure time, e.g. 1/100 sec, the diaphragm mechanism is automatically used only for providing the working aperture, at low movement rate, but not for the closing of the shutter opening. In this case, both the opening and the closing of the shutter opening are effected automatically at a selective movement rate by the shutter sectors 2 in the usual way. This gives the special advantage of additional care of the diaphragm mechanism and conserves its useful life.

For the purpose of protecting the shutter sector driving system the movement of the shutter sectors 2, for both opening and closing the shutter opening and lens passage, may be effected for this limiting exposure time in a convenient manner at lower speeds than the maximum speed. This is because, at such a longer effective exposure time or delay interval $t_e$, there is no need, derived from practical results of exposure, for very short or high speed opening and closing times. With the use of this further feature according to the present invention, a shutter assembly or means is therefore provided which is characterized by an unusual degree of freedom from wear and tear and thus has an extremely long life, under adjustably controlled operation as contemplated herein.

In this regard, as FIGS. 6 and 7 show, and as the artisan will appreciate, the diaphragm segments are normally operated more extensively than the shutter sectors as a general rule, because they serve for adjustment and readjustment of the working aperture as well as for closing the shutter opening whereas the shutter sectors only perform one opening and one closing movement, i.e. for the taking of a given photograph. Therefore, the differential movement rate control of the operation of the diaphragm system, especially in conjunction with the preferably associated lock system, will provide a more pronounced minimization of wear and tear than that of the less frequently operated shutter system at any given movement rate.

According to the above-described embodiment and as also illustrated in the drawings, preferably electrodynamic driving systems A and B are provided for driving the shutter sectors or blades and the diaphragm segments. However, as the artisan will appreciate, the application of the diaphragm control system according to the present invention is not limited to these driving systems, but is such that the adjustably controlled operation may also be carried out with a purely mechanical device based on a spring drive, for example, i.e. suitably controlled in its extent and duration of operation by the contemplated control means. Nevertheless, the need for greater mechanical sophistication as well as the problem of poorer control flexibility, than in the case of the preferred use of electrodynamic driving systems, would have to be accepted with such a known spring drive.

Although the setting of the working diaphragm system by means of an electromagnetic-mechanical locking arrangement 30 to 33, whether as a ratchet lock, friction lock, or the like, has specific advantages, this does not exclude the fact that other setting devices may also be used for the same purpose in carrying out the present invention. For example, the working aperture setting may suitably also be obtained by means of a stepping motor or light barrier positioning device in the conventional manner. However, the use of a magnetic lock system 30 to 33 is regarded as being of greater advantage because of its less complicated and less expensive design.

In review, the present invention advantageously provides a differentially controllable shutter device for a camera for achieving extremely short selective or predetermined exposure times at selectively sized diaphragm apertures when taking photographs with the camera. The device contemplates a lens shutter assembly having a lens passage for film exposure fitted with a reciprocating shutter sector system of sectors movable between a closed position and an open position for opening the lens passage and a cooperating reciprocating diaphragm segment system of segments movable between a closed position and a selectively sized open position for forming the diaphragm working aperture of the lens passage and also separately selectively for closing the lens passage after a suitable time delay.

The controllable device contemplates control means specifically arranged for controlling the nature, sequence, extent and duration of the operation of the lens shutter assembly, and essentially for sequential operation for effecting initial diaphragm adjustment of the diaphragm segments at a low selective movement rate, i.e. at low driving energy or low operating speed, for formation of a selectively sized diaphragm working aperture before film exposure, then for effecting timed exposed shutter opening movement of the shutter sectors from the closed position to the open position for opening the lens passage for film exposure, and thereafter for effecting subsequent shutter closing movement of the diaphragm segments at a correspondingly high movement rate, i.e. at high driving energy or high operating speed, relative to the initial low movement rate thereof, at the end of a selectively timed interval following the timed opening movement of the shutter sectors and corresponding to the selective exposure time, for closing the lens passage, whereby to terminate film exposure.

The control means desirably include adjustment means specifically arranged for effecting differential movement rate operation of the lens shutter assembly systems for selectively varying the size or value of the working aperture and the duration of the timed exposure interval, as the case may be. The adjustment means may contemplate the usual manually operated setting members and switch means specifically arranged in the control means for setting the working aperture and for setting the shutter speed movement rate and exposure interval duration, in dependence upon the sensed lighting conditions, in conjunction with the associated differential movement rate controllable drive means provided, on the one hand, for operating the shutter sectors as opening shutter means to start film exposure at the preset working aperture and in turn the diaphragm segments as closing shutter means to terminate film exposure when taking photographs at the stated extremely short selective exposure times, or, on the other hand, for operating just the shutter sectors as opening and closing shutter means both to start and terminate film exposure at the preset working aperture when alternatively taking photographs at a corresponding longer selective exposure time than that at such stated extremely short selective exposure times.

Such controllable drive means are specifically arranged for independently selectively moving the shutter system and for independently selectively moving the diaphragm system each at a corresponding selective movement rate, i.e. magnitude of energizing power or operating speed, in dependence upon the sensed ambient lighting conditions and chosen parameter combination of aperture size and exposure duration relative thereto. The drive means may comprise purely mechanical drives such as conventional spring drive systems, or more preferably electrodynamic or electromagnetic drives. In cooperation therewith, controllable movement arresting or stopping means are desirably included for selectively arresting further movement of the diaphragm system at the end of a given differential phase or operation thereof, e.g. at the end of its high rate closing movement when used to close the shutter opening for terminating film exposure, whereby to minimize wear and tear on the diaphragm system parts.

More particularly, the electromagnetic drive means contemplate an electromagnetic shutter drive for selectively moving the shutter system at a selective movement rate, e.g. a selective high movement rate when operated to start film exposure when taking photographs at the stated extremely short exposure times, or a selective low movement rate relative to such high movement rate when operated both to start and terminate film exposure when alternatively taking photographs at a correspondingly longer selective exposure time than that at such stated extremely short exposure times. The drive means also contemplate, in this regard, a separate electromagnetic diaphragm drive for selectively moving the diaphragm system as concordant selectively different movement rates corresponding to the stated low movement rate and high movement rate respectively for formation of the working aperture and for closing the shutter opening for terminating film exposure, as the case may be.

For advantageous automatic operation, the control means may include an electronic control circuit of the usual type for controlling the differential energization of the electromagnetic drives but in specific dependence upon the adjustment of the adjustment means as contemplated by the present invention. In turn, where the movement arresting means are provided as a suitable electromagnetic-mechanical movement arresting system, such control circuit may appropriately control the energization of the arresting system as well.

More specifically, the control circuit may include an electronic threshold value arrangement for controlling the value or parameter which determines the size of the working aperture, i.e. in dependence upon the sensed ambient lighting conditions and the chosen exposure time interval parameter, and the arresting system may be provided in the form of an electromagnetic-mechanical locking system located operatively in the circuit in dependence upon the threshold value circuit for arresting further movement of the diaphragm system, for instance after initial diaphragm adjustment movement to form a selectively sized diaphragm working aperture corresponding to such value.

Desirably, the control circuit may include switch means for interrupting the energization of the electromagnetic diaphragm drive synchronously with the generation of a switch pulse initiating the energization of the electromagnetic-mechanical locking system. This will effectively permit more precise operation of the moving parts while minimizing wear and tear thereon.

In accordance with a preferred feature of the present invention, the diaphragm segment system includes a movable actuating member, e.g. a ring, operatively connected to the diaphragm segments for moving the segments between the closed position and the selectively sized open position, i.e. in reciprocating or oscillating path fashion, and the electromagnetic-mechanical locking system includes a locking arrangement having a ratchet part composed of ratchet teeth linearly disposed on the actuating member and a lock part composed of a teeth-engaging pawl disposed on the device at a spaced point in aligned relation to the ratchet teeth on the actuating member for movement into and out of locking engagement with the ratchet teeth in dependence upon the energization of the locking system.

By way of a cognate modification, the ratchet teeth may be linearly arranged on the actuating member, or may, in two side by side longitudinal or circumferential rows of teeth offset with respect to each other by a portion of the pitch of the teeth such that each tooth in one row is located linearly between the two adjacent teeth in the other row in relation to the common logitudinal direction of the rows.

By way of a further cognate modification, the electromagnetic-mechanical locking system includes a friction lock arrangement having a friction engagement surface part constituted by a portion of the surface of the actuating member, or ring rim, and a friction imparting lock part containing or composed of material possessing a high coefficient of friction, e.g. rubber, and disposed on the device at such spaced point in aligned relation to the friction engagement surface part on the actuating member, or rim of the ring, for movement into and out of locking engagement with such engagement surface, i.e. in dependence upon the energization of the locking system.

As is clear from the foregoing, the controllable shutter device basically contemplates control means which are adjustable, when alternatively taking photographs at a predetermined exposure time which is longer than the extremely short selective exposure times for which the diaphragm system is used at a slow movement rate for diaphragm working aperture formation and at a fast movement rate for closing the shutter opening or light passage. According to such alternative, the control means are specifically adjustable to operate in the usual way, for first effecting initial diaphragm adjustment movement of the diaphragm segments, e.g. at such slow movement rate, for formation of a selectively sized diaphragm working aperture before film exposure and then for effecting timed exposure shutter opening movement of the shutter sectors from the closed position to the open position for opening the lens passage for film exposure, followed by shutter closing movement of the shutter sectors from the open position to the closed position at the end of such longer predetermined exposure time for closing the light passage, whereby to terminate film exposure.

Since the speed of operation is understandably not as critical at such longer exposure time, the opening and closing movements of the shutter sectors can be conveniently carried out at a corresponding selective low movement rate, i.e. by automatic adjustment of the microcomputer when the camera is set in the usual manner for alternatively taking such longer exposure photographs. On the other hand, in taking photographs at such extremely short selective exposure times according to the principle feature of the present invention, while understandably the initial movement of the diaphragm segments may be effected at a particular selected low movement rate, affording sufficient intervening time for the diaphragm segments to come to rest, especially under the influence of the preferably included movement arresting means, the opening movement of the shutter sectors and certainly the subsequent closing movement of the diaphragm segments will be effected at a particular selected high movement rate relative to such low movement rate for the desired purposes.

It will be appreciated that in the latter instance, the subsequent closing movement of the diaphragm segments must be effected at the stated fast or high movement rate to obtain a precise extremely short exposure time as measured between the average completion of the opening movement of the shutter sectors which starts the film exposure and the average completion of the subsequent closing movement of the diaphragm segments which terminates which film exposure. Hence, the speed of operation is understandably critical in this latter instance, especially the speed of operation of the subsequent closing movement of the diaphragm segments at the precise end of the average completion of the opening movement of the shutter sectors (see FIGS. 6 and 7), i.e. even if the speed of the shutter sector opening movement is differentially non-critically slower than the critical fast speed of the diaphragm segment shutter closing movement.

Accordingly for relatively complete versatility of operation, differentially controllable drive means, especially electromagnetic drive means, are provided for independently selectively moving the shutter system and for independently selectively moving the diaphragm system each at a corresponding selective movement rate, and the control means are adjustable for alternatively effecting movement of the shutter sectors at a lower movement rate when taking photographs at such longer predetermined exposure times and for which the diaphragm system is used only for formation of the working aperture and not for closing the light passage. Such as preferably attained by the inclusion of an electronic control circuit for controlling the differential energization of the drive means, especially the electromagnetic drive means, for effecting differential movement of the shutter and diaphragm systems independently of each other and at a corresponding selective movement rate in dependence upon appropriate adjustment of the adjustment means.

It will be appreciated that the foregoing specification and drawings are set forth by way of illustration and not limitation, and that various modifications and changes may be made therein without departing from the spirit and scope of the present invention which is to be limited solely by the scope of the appended claims.

What is claimed is:

1. Controllable shutter device for a camera for achieving extremely short selective exposure times at selectively sized diaphragm apertures when taking photographs with the camera, which comprises a lens shutter assembly having a lens passage for film exposure fitted with a reciprocating shutter sector system of sectors movable between a closed position and an open position for opening the lens passage and a reciprocating diaphragm segment system of segments movable between a closed position and a selectively sized open position for forming the diaphragm working aperture of the lens passage and for closing the lens passage, and control means for effecting initial diaphragm adjustment movement of the diaphragm segments at a low movement rate for formation of a selectively sized diaphragm working aperture before film exposure, then for effecting timed exposure shutter opening movement of the shutter sectors from the closed position to the open position for opening the lens passage for film exposure, and thereafter for effecting subsequent shutter closing movement of the diaphragm segments at a correspondingly high movement rate relative to the initial low movement rate thereof, at the end of a selectively timed interval following the timed opening movement of the shutter sectors and corresponding to the selective exposure time, for closing the lens passage, whereby to terminate film exposure.

2. Device according to claim 1 wherein the control means include adjustment means for selectively varying the size of the working aperture and the duration of such timed interval.

3. Device according to claim 1 wherein controllable drive means are provided for independently selectively moving the shutter system and for independently selectively moving the diaphragm system each at a corresponding selective movement rate.

4. Device according to claim 1 wherein controllable movement arresting means are provided for selectively arresting further movement of the diaphragm system.

5. Device according to claim 1 wherein an electromagnetic shutter drive is provided for selectively moving the shutter system at a selective movement rate and an electromagnetic diaphragm drive is provided for selectively moving the diaphragm system at concordant selectively different movement rates corresponding to the low movement rate and the high movement rate.

6. Device according to claim 5 wherein the control means include adjustment means for selectively varying the size of the working aperture and the duration of such timed interval.

7. Device according to claim 6 wherein the control means includes an electronic control circuit for controlling the energization of the electromagnetic drives in dependence upon the adjustment of the adjustment means.

8. Device according to claim 7 wherein an electromagnetic-mechanical movement arresting system is provided for selectively arresting further movement of the diaphragm system.

9. Device according to claim 8 wherein the control circuit controls the energization of the movement arresting system.

10. Device according to claim 9 wherein the control circuit includes an electronic threshold value arrangement for controlling the value which determines the size of the working aperture, and the movement arresting system includes an electromagnetic-mechanical locking system located in the circuit in dependence upon such threshold value arrangement for arresting further movement of the diaphragm system after initial diaphragm adjustment movement to form a selectively sized diaphragm working aperture corresponding to such value.

11. Device according to claim 10 wherein the control circuit includes switch means for interrupting the energizing of the electromagnetic diaphragm drive synchronously with the generation of a switch pulse initiating the energization of the electromagnetic-mechanical locking system.

12. Device according to claim 11 wherein the diaphragm segment system includes a movable activating member operatively connected to the diaphragm segments for moving the segments between the closed position and the selectively sized open position, and the electromagnetic-mechanical locking system includes a ratchet lock arrangement having a ratchet part composed of ratchet teeth linearly disposed on the actuating member and a lock part composed of a teeth engaging pawl disposed on the device at a spaced point in aligned relation to the ratchet teeth on the actuating member for movement into and out of locking engagement with the ratchet teeth in dependence upon the energization of the locking system.

13. Device according to claim 12 wherein the ratchet teeth are linearly arranged on the actuating member in two side by side longitudinal rows of teeth offset with respect to each other by a portion of the pitch of the teeth such that each tooth in one row is located linearly between the two adjacent teeth in the other row in relation to the common longitudinal direction of the rows.

14. Device according to claim 11 wherein the diaphragm segment system includes a movable actuating member operatively connected to the diaphragm segments for moving the segments between the closed position and the selectively sized open position, and the electromagnetic-mechanical locking system includes a friction lock arrangement having a friction engagement surface part constituted by a portion of the surface of the actuating member and a friction imparting lock part containing material having a high coefficient of friction and disposed on the device at a spaced point in aligned relation to the friction engagement surface engagement surface part on the actuating member for movement into and out of locking engagement with such engagement surface in dependence upon the energization of the locking system.

15. Device according to claim 1 wherein the control means are adjustable, when taking photographs at a predetermined exposure time which is longer than the extremely short selective exposure times for which the diaphragm system is used for closing the light passage, for effecting initial diaphragm adjustment movement of the diaphragm segments for formation of a selectively sized diaphragm working aperture before film exposure, and then for effecting timed exposure shutter opening movement of the shutter sectors from the closed position to the open position for opening the lens passage for film exposure followed by shutter closing movement of the shutter sectors from the open position to the closed position at the end of such longer predetermined exposure time for closing the light passage, whereby to terminate film exposure.

16. Device according to claim 15 wherein controllable drive means are provided for independently selectively moving the shutter system and for independently selectively moving the diaphragm system each at a corresponding selective movement rate, and the control means are adjustable for effecting movement of the shutter sectors at a lower movement rate when taking photographs at such longer predetermined exposure time than that when taking photographs at such extremely short selective exposure times for which the diaphragm system is used for closing the light passage.

17. Device according to claim 16 wherein the drive means are electromagnetic drive means, and the control means include an electronic control circuit for controlling the energization of the electromagnetic drive means for effecting movement of the shutter system and of the diaphragm system independently of each other and at a corresponding selective movement rate.

* * * * *